(12) United States Patent
Nakamura et al.

(10) Patent No.: US 6,606,238 B1
(45) Date of Patent: Aug. 12, 2003

(54) ELECTROCONDUCTIVE PASTE, METHOD OF PRODUCING MONOLITHIC CERAMIC ELECTRONIC PART, AND MONOLITHIC CERAMIC ELECTRONIC PART

(75) Inventors: Tomoyuki Nakamura, Shiga-ken (JP); Motohiro Shimizu, Kusatsu (JP); Harunobu Sano, Kyoto (JP)

(73) Assignee: Murata Manufacturing Co. Ltd (JP)

( * ) Notice: Subject to any disclaimer, the term of this patent is extended or adjusted under 35 U.S.C. 154(b) by 25 days.

(21) Appl. No.: 10/265,262

(22) Filed: Oct. 7, 2002

(30) Foreign Application Priority Data

Oct. 5, 2001 (JP) .......................... 2001-310383
Aug. 14, 2002 (JP) .......................... 2002-236240

(51) Int. Cl.[7] ............................................. H01G 4/008
(52) U.S. Cl. ............................ 361/321.2; 361/321.5; 501/138
(58) Field of Search .................... 361/321.1, 321.2, 361/321.3, 321.4, 321.5, 322; 501/134, 135, 136, 137, 138; 29/25.41, 25.42

(56) References Cited

U.S. PATENT DOCUMENTS

| | | | | |
|---|---|---|---|---|
| 4,652,967 A | * | 3/1987 | Sakabe et al. | 361/309 |
| 5,231,558 A | * | 7/1993 | Tatsuta | 361/321.2 |
| 5,600,533 A | * | 2/1997 | Sano et al. | 361/321.4 |
| 6,043,974 A | * | 3/2000 | Chen et al. | 361/311 |

* cited by examiner

Primary Examiner—Anthony Dinkins
(74) Attorney, Agent, or Firm—Dickstein, Shapiro, Morin & Oshinsky, LLP (57) ABSTRACT

A conductive paste contains a ceramic powder in addition to a conductive metal powder and an organic vehicle. The ceramic powder is a powder produced by calcining an $ABO_3$ system in which A represents Ba or alternatively Ba partially substituted by at least one of Ca and Sr, and B represents Ti or alternatively Ti partially substituted by at least one of Zr and Hf, the system containing at least one selected from the group of consisting of Re compounds (La or the like), Mg compounds, and Mn compounds. The ceramic powder has an average grain size smaller than that of the metal powder and being incapable of sintering at the sintering temperature of the substrate-use ceramic.

20 Claims, 2 Drawing Sheets

ELECTROCONDUCTIVE PASTE, METHOD OF PRODUCING MONOLITHIC CERAMIC ELECTRONIC PART, AND MONOLITHIC CERAMIC ELECTRONIC PART

BACKGROUND OF THE INVENTION

1. Field of the Invention

The present invention relates to an electroconductive paste, a method of producing a monolithic ceramic electronic part in which the conductive paste is used to form inner conductor films, and a monolithic ceramic electronic part made from the conductive paste and in particular, to an improvement in that structural defects can be suppressed even if layers contained in a monolithic ceramic electronic part are thinned and the number of the layers is increased.

2. Description of the Related Art

Monolithic ceramic capacitors as examples of monolithic ceramic electronic parts are generally produced by the following method.

First, ceramic green sheets containing a dielectric ceramic raw material and having inner conductor films formed in required patterns on a surface of the sheets by use of a conductive paste containing a conductive component are prepared. For example, a material containing $BaTiO_3$ as a major component is employed as the dielectric ceramic raw material.

A plurality of ceramic green sheets including the above-described ceramic green sheets having the inner conductor films formed thereon are laminated and hot-press bonded. Thus, an integrated green laminate is produced.

Subsequently, the green laminate is fired. Thereby, a sintered laminate is obtained. The laminate has a lamination structure containing a plurality of the ceramic layers which are made form the above-described ceramic green sheets. The above-described inner conductor films are arranged via the ceramic layers inside the laminate so that an electrostatic capacitance can be generated.

Then, outer electrodes are formed on the surface of the laminate to be electrically connected to specific ones of the inner conductor films for use of the static capacitance.

Thus, a monolithic ceramic capacitor is produced.

In recent years, the ceramic layers of such monolithic ceramic capacitors have been further thinned and the number of the layers has been increased for the purpose of reducing the size and increasing the capacitance.

To thin the ceramic layers and increase the number of the ceramic layers, it is important to sufficiently harmonize the shrinkage behaviors during firing of the ceramic layers and the inner conductor films with each other.

Ordinarily, the shrink-starting temperatures of conductive metallic powders contained in inner conductor films are considerably lower than those of the ceramic layers. In the case in which there are differences between the shrink behaviors of the conductive metallic powders and the ceramic layers, relatively large stresses are generated inside the monolithic ceramic capacitors, so that the thermal impact resistances are reduced, and seriously, cracks and peeling may be caused between the ceramic layers and the inner conductor films.

To solve the above-described problems, for example, Japanese Unexamined Patent Application Publication No. 6-290985 has proposed a method of causing the shrink behavior of the inner conductor films to approach that of the ceramic layers as much as possible. According to that method, different types of ceramic raw material powders of which the compositions are the same as or different from those of ceramic raw materials contained in the ceramic layers are added to conductive pastes for forming the inner conductor films.

According to the above-described Japanese Unexamined Patent Application Publication No. 6-290985, oxides of Zr, rare earth elements and the like are added to a conductive paste to suppress the conductive metallic powder contained in the conductive paste from sintering, so that the shrink behavior of the inner conductor films can approach that of the ceramic layers. Thereby, successfully, cracking and peeling between the ceramic layers and the inner conductor films are suppressed.

In addition to Japanese Unexamined Patent Application Publication No. 6-290985, for example, Japanese Examined Patent Application Publication No. 5-63929, Japanese Unexamined Patent Application Publication Nos. 2001-15375, 2000-269073, and 6-969998 and so forth, describe that ceramic raw material powders are added to conductive pastes for forming inner conductor films. In these Patent Specifications, it is described as advantages of the inventions that the dielectric constants are increased, and the coverage of inner conductor films is enhanced in addition to the prevention of structural defects in monolithic ceramic capacitors.

With the recent advancement of electronics, the size of small electronic parts has been remarkably reduced. Also, for monolithic ceramic capacitors, it has been required to further reduce the size and increase the capacitance. For example, monolithic ceramic capacitors having a ceramic layer thickness of about 2 $\mu$m are about to be provided for practical applications.

Regarding the inner conductor films, film-thicknesses of about 1 to 2 $\mu$m are employed in most cases. Accordingly, the thickness of each of the ceramic layers becomes nearly equal to that of each of the inner conductor films. As a result, the problems caused by the difference between the shrink behaviors at firing of the ceramic layers and the inner conductor films become more serious. Thus, structural defects are readily caused in the monolithic ceramic capacitors.

From the standpoint of the principle of material diffusion, it is supposed that some reaction occurs between ceramic raw materials contained in a conductive paste for forming inner conductor films and components present on the ceramic layer side. For example, according to the method described in Japanese Unexamined Patent Application Publication No. 6-290985, structural defects in the monolithic ceramic capacitor can be suppressed. However, a metal oxide, which is not a major component of the ceramic layers, is added to the conductive paste, and therefore, the metal oxide contained in the conductive paste and a component contained in the ceramic layers react with each other. This may change the electrical characteristic of the ceramic layers.

If the above-described reaction occurs uniformly, the problems will not become serious. However, since the reaction occurs unevenly as a practical matter, the electrical characteristics of the ceramic layers are locally changed. This causes the electrical characteristics of the monolithic ceramic capacitor to disperse.

In particular, as described in Japanese Patent No. 2722457, when an oxide of a rare earth element is added to a conductive paste, the part of the ceramic layers in contact with the rare earth element oxide powder becomes semiconductive. Thus, the thickness of the part of the ceramic layers which practically function as a dielectric is smaller than the apparent thickness of the ceramic layers. As a result, the reliability of the insulation resistance and the other electrical characteristics of the monolithic ceramic capacitor is deteriorated. Therefore, the method in which the rare earth element oxide is added cannot correspond to the thinning of the ceramic layers.

In the case in which a conductive paste having rare earth element oxides added thereto is used, advantages such as increase of the dielectric constant, enhancement of the reliability and so forth, can be obtained by devising the application method, as described in Japanese Examined Patent Application Publication No. 5-63929 and Japanese Unexamined Patent Application Publication No. 2001-15375. However, a major component of the ceramic layers and this major component of the conductive paste, which are metal oxides different from each other, react with each other at random. Therefore, the electrical characteristics of the ceramic layers are dispersed. This causes the electrical characteristics of the monolithic ceramic capacitor as a product to be disperse.

To cope with the above-described dispersion, products may be selected for shipment so as to comply with the standards for the respective characteristics. In this case, the yield in mass-production is low. The defective proportion is high. The high cost is also a problem.

It is estimated that a thickness of up to 1 µm will be employed in future. Thus, if further thinning of the ceramic layers is realized, the effects of the dispersion will be more remarkable. Thus, the above-described problems will become more serious.

In case in which a metal oxide such as a rare earth element oxide, which is different from a major component of ceramic layers, is added to a conductive paste for forming inner conductor films, it may be more effective if the metal oxide is added not singly but together with the major component of the ceramic layers or a component analogues to the major component.

However, when the methods described in Japanese Unexamined Patent Application Publication No. 2001-1537 and Japanese Unexamined Patent Application Publication No. 2000-269073 are used while the above-described technique is applied, the rare earth element oxide diffuses into the ceramic layers and reacts with components of the ceramic layers. This causes the electrical characteristics of the monolithic ceramic capacitor to disperse, resulting in deterioration of the yield in mass production and an increase of the proportion of defectives.

Under the above-described situations, it is desired to develop a conductive paste for forming inner conductor films which cause no structural defects in monolithic ceramic capacitors and exerts substantially no undesired influences over the electrical characteristics of the ceramic layers, even if the sizes of the monolithic ceramic capacitors are reduced more, and the capacitances are further increased.

The above-description is true of other monolithic ceramic electronic parts in addition to the monolithic ceramic capacitor.

SUMMARY OF THE INVENTION

Accordingly, it is an object of the present invention to provide an electroconductive paste, a method of producing a monolithic ceramic electronic part in which the conductive paste is used to form inner conductor films, and a monolithic ceramic electronic part formed by use of the conductive paste.

This invention has been devised by the inventors of the invention, based on the following knowledge.

That is, to cause the shrink behavior of the inner conductor films at firing to approach that of the ceramic layers, it is effective that the grains of a ceramic powder finer than those of a conductive metallic powder contained in a conductive paste for forming the inner conductor films, and are uniformly distributed between the grains of the conductive metallic powder contained in the dried conductive paste before firing. Thereby, effects by the addition of the ceramic powder can be realized. Thus, the required amount of the ceramic powder to be added to the conductive paste can be suppressed and minimized.

When a metal oxide, which is not a major component of the ceramic layers, is added to the conductive paste for forming the inner conductor films, the metal oxide is added not singly but together with the major component of the ceramic layers or a component analogous to the major component. However, the components of the ceramic layers are not directly mixed and added to the conductive paste. Preferably, they are previously heat-treated, so that they become impossible to be sintered at the sintering temperature of a ceramic used as the substrate, and thereafter, are added to the conductive paste.

The conductive paste of the present invention devised based on the above-described knowledge is used to form inner conductor films of a monolithic ceramic electronic part, which contains a plurality of ceramic layers composed of substrate ceramic layers and the inner conductor films extending on specific boundaries between the ceramic layers. Characteristically, the conductive paste has the following constitution.

That is, the conductive paste contains a conductive metallic powder, a ceramic powder and an organic vehicle.

The ceramic powder is a powder produced by calcining an $ABO_3$ system ceramic in which A represents Ba or alternatively Ba partially substituted by at least one of Ca and Sr, and B represents Ti or alternatively Ti partially substituted by at least one of Zr and Hf, the system containing at least one selected from the group of consisting of Re compounds in which Re represents at least one of La, Ce, Pr, Nd, Sm, Eu, Gd, Th, Dy, Ho, Er, Tm, Yb, Lu and Y, Mg compounds and Mn compounds. The ceramic powder has an average grain size smaller than that of the metal powder and is incapable of sintering at the sintering temperature of the substrate-use ceramic.

Preferably, the metallic powder is at least one selected from the group of Ag, Ag-base alloys, Ni, Ni-base alloys, Cu, and Cu-base alloys.

According to the present invention, there is provided a method of producing a monolithic ceramic electronic part having a plurality of ceramic layers made of a substrate ceramic and inner conductor films extending specific boundaries between the ceramic layers.

The method of producing a monolithic ceramic electronic part comprises the steps of preparing a ceramic green sheet containing as a major component a substrate ceramic raw material powder having the general formula $A'B'O_3$ in which A' represents Ba or alternatively Ba partially substituted by at least one of Ca and Sr, and B' represents Ti or alternatively Ti partially substituted by at least one of Zr and Hf, and laminating a plurality of the ceramic green sheets so as to form the ceramic layers to produced a green laminate in which the above-described electroconductive paste is provided on specific boundaries between the ceramic green sheets to form the inner conductor films, and firing the green laminate.

Preferably, this production method is applied to a method of producing a monolithic ceramic capacitor. In this case, the method further comprises the step of arranging the inner conductor films to be formed by use of the conductive paste via the ceramic layers in such a manner that a static capacitance can be generated, and after the firing step for the green laminate, forming outer electrodes on the outer surface of the sintered laminate in such a manner that the outer electrodes are electrically connected to specific ones of the inner conductor films to use the static capacitance.

Further, according to the present invention, there is provided a monolithic ceramic electronic part which comprises a plurality of ceramic layers made of a substrate ceramic and inner conductor films extending specific boundaries between the ceramic layers.

In this monolithic ceramic electronic part, the substrate ceramic contains a major component expressed by the general formula A'B'O$_3$ in which A' represents Ba or alternatively Ba partially substituted by at least one of Ca and Sr, and B' represents Ti or alternatively Ti partially substituted by at least one of Zr and Hf, and the inner conductor films are made of a sintered material produced by firing the above-described conductive paste.

Preferably, the monolithic ceramic electronic part is a monolithic ceramic capacitor. In this case, the inner conductor films are arranged via the ceramic layers in such a manner that a static capacitance can be generated, and the part further comprises outer electrodes formed on the outer surface of the sintered laminate in such a manner that the outer electrodes are electrically connected to specific ones of the inner conductor films to use the static capacitance.

DESCRIPTION OF THE PREFERRED EMBODIMENTS

Figure 1:
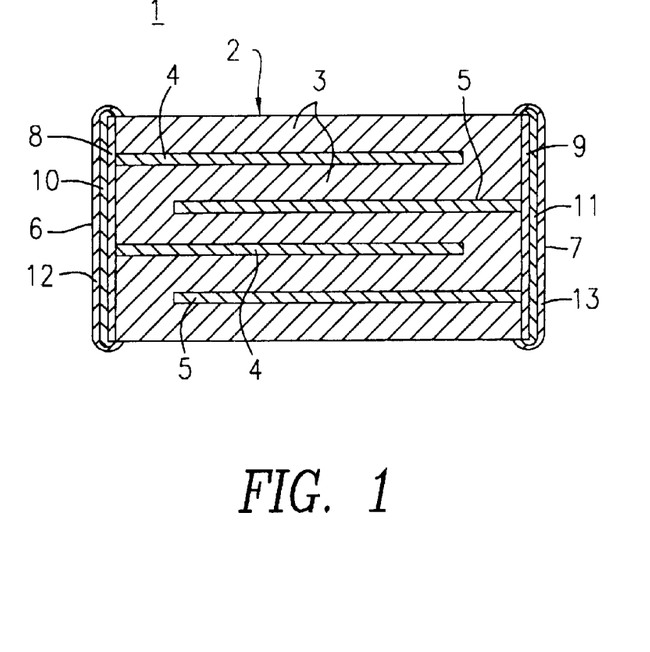
FIG. 1 is a schematic cross-sectional view of a monolithic ceramic capacitor as an example of a monolithic ceramic electronic part formed by use of a conductive paste according to an embodiment of the present invention.

FIG. 1 is a schematic cross-sectional view of a monolithic ceramic capacitor 1 which is an example of a monolithic ceramic electronic part formed by a conductive paste according to an embodiment of the present invention.

The monolithic ceramic capacitor 1 contains a laminate 2. The laminate 2 comprises a plurality of dielectric ceramic layers 3 laminated to each other, and a plurality of inner conductor films 4 and 5 formed on specific boundaries between a plurality of the dielectric ceramic layers 3.

The inner conductor films 4 and 5 are formed so as to reach the outer surface of the laminate 2. The inner conductor films 4 extended to one end face 6 of the laminate 2 and the inner conductor films 5 extended to the other end face 7 of the laminate 2 are alternately arranged via the dielectric ceramic layers 3 inside the laminate 2 in such a manner that electrostatic capacities can be generated.

To use the above-described static capacities, outer electrodes 8 and 9 are formed on the outer surface of the laminate 2, that is, on the end faces 6 and 7 thereof, so as to be connected to specific ones of the inner conductor films 4 and 5. First plating layers 10 and 11 made of nickel, copper or the like, are formed on the outer electrodes 8 and 9, respectively. Second plating layers 12 and 13 made of solder, tin or the like, are formed thereon, respectively.

In the monolithic ceramic capacitor 1, a substrate ceramic for forming the dielectric ceramic layers 3 contains a major component expressed by the general formula A'B'O$_3$ in which A' represents at least one of Ba or alternatively Ba partially substituted by at least one of Ca and Sr, and B' represents Ti or alternatively Ti partially substituted by at least one of Zr and Hf.

On the other hand, the inner conductor films 4 and 5 are made of a sintered material obtained by firing a conductive paste having the following composition: a conductive metallic powder, a ceramic powder and an organic vehicle.

As the conductive metallic powder, for example, powders of Ag, an Ag-base alloy, Ni, an Ni-base alloy, Cu, a Cu-base alloy, and mixtures thereof are used.

The ceramic powder is a powder produced by calcining an ABO$_3$ system ceramic in which A represents Ba or alternatively Ba partially substituted by at least one of Ca and Sr, and B represents Ti or alternatively Ti partially substituted by at least one of Zr and Hf, the system containing at least one selected from the group of consisting of Re compounds in which Re represents at least one of La, Ce, Pr, Nd, Sm, Eu, Gd, Tb, Dy, Ho, Er, Tm, Yb, Lu, and Y, Mg compounds and Mn compounds. The ceramic powder has an average grain size smaller than that of the metal powder and is incapable of being sintered at the sintering temperature of the substrate ceramic.

The above-described ceramic powder is a powder obtained after the calcining. In this case, the calcined material of the ABO$_3$ system and, as an addition component, at least one of the Re compounds, the Mg compounds and the Mn compounds may be mixed and calcined. Alternatively, the above-described compound as an addition component may be added to and mixed with ACO$_3$ and BO$_2$ as starting materials of the ABO$_3$ system, and then, these materials are simultaneously calcined.

Referring to the ceramic powder contained in the conductive paste for forming the inner conductor films 4 and 5, the average grain size is smaller than that of the metallic powder contained in the same conductive paste, and can not be sintered at the sintering temperature of a substrate ceramic. Thereby, as apparent from the experimental examples which will be described below, structural defects in the monolithic ceramic capacitor 1 can be suppressed from occurring. Moreover, the electrical characteristics can be suppressed from dispersing. As a result, the dielectric ceramic layers 3 can be advantageously thinned.

The monolithic ceramic capacitor 1 shown in FIG. 1 can be produced as follows.

First, a slurry containing the above-described substrate ceramic raw material powder having a major component expressed by the above-described general formula A'B'O$_3$ is prepared. The slurry is formed into a sheet. Thus, a ceramic green sheet is prepared.

Then, the inner conductor films 4 and 5 having required patterns are formed on the ceramic green sheet by printing or the like, using the above-described conductive paste having the specific composition.

Then, a required number of the ceramic green sheets having the inner conductor films 4 and 5 formed thereon, respectively, are laminated, and moreover, ceramic green sheets having no inner conductor films formed thereon are laminated to the upper and lower sides of the laminate made of the green sheets, and hot-pressed to be bonded to each other. Thus, the integrated laminate 2 in the green state is obtained.

Subsequently, the green laminate 2 is fired in a reducing atmosphere, and thereby, the laminate 2 is sintered. In the sintered laminate 2, the above-described green sheets form the dielectric ceramic layers 3, and the conductive paste applied so as to form the inner conductor films 4 and 5, respectively, is a sintered material.

Then, the outer electrodes 8 and 9 are formed on the end faces 6 and 7 of the laminate 2 so as to be connected to specific ones of the inner conductor films 4 and 5, respectively. The materials for the outer electrodes 8 and 9 may be the same as those for the inner conductor films 4 and 5. As conductive components of the outer electrodes 8 and 9, Pd and Ag—Pd alloys may be used in addition to Ag, Ag-base alloys, Ni, Ni-base alloys, Cu, and Cu-base alloys described previously as an example. Moreover, glass frits of the $B_2O_3$—$Li_2O$—$SiO_2$—BaO, $B_2O_3$—$SiO_2$—BaO type, or the like, added to a metallic powder may be employed. An appropriate material should be selected considering the uses and use environment of the monolithic ceramic capacitor 1.

Ordinarily, the outer electrodes 8 and 9 are formed by applying a paste containing a conductive metallic powder onto the sintered laminate 2, and baking it. The paste may be applied on the laminate 2 in the green state and baked together with the laminate 2 during the firing process for the laminate 2.

Thereafter, the outer electrodes 8 and 9 are plated with nickel, copper or the like, to form the fist plating layers 10 and 11, and moreover, are plated with solder, tin, or the like to form the second plating layers 12 and 13, respectively. Thus, the monolithic ceramic capacitor 1 is produced.

Hereinbefore, the present invention has been described with reference to the monolithic ceramic capacitor. The conductive paste of the present invention can be advantageously applied to other monolithic ceramic electronic parts to form inner conductor films, in addition to the monolithic ceramic capacitor, provided that the monolithic ceramic electronic part comprises a plurality of ceramic layers made of a substrate ceramic and inner conductor films extended on specific boundaries between the ceramic layers.

Hereinafter, preferred ranges of the composition of the conductive paste of the present invention, the properties and characteristics of a ceramic powder contained in the conductive paste, and so forth will be described. Moreover, experimental examples carried out to identify the advantages of the present invention will be described.

EXPERIMENTAL EXAMPLES

Experiment 1

In Experiment 1, a substrate ceramic containing a major component of $BaTiO_3$ with a Ba/Ti ratio of 1.004 and $Dy_2O_3$, MgO, MnO and $SiO_2$ added thereto, was used. As a conductive metallic powder to be contained in a conductive paste for forming inner conductor films, a nickel powder was used.

In particular, as starting materials for the substrate-use ceramic, $TiCl_4$ and $Ba(NO_3)_2$ each having a purity of at least 99.9% were prepared. After weighing, they were precipitated by use of oxalic acid to form titanyl barium oxalate $\{BaTiO(C_2O_4) \cdot 4H_2O\}$. The precipitate was pyrolyzed at a temperature of 1000° C., so that $BaTO_3$ as a major component was formed. Thus, the $BaTiO_3$ powder with an average grain size of 0.3 μm was obtained.

On the other hand, powders of $Dy_2O_3$, MgO, MnO and $SiO_2$ each having an average grain size of 0.1 μm were prepared.

Subsequently, 1 mol of $Dy_2O_3$, 1.5 mols of MgO, 0.2 mol of MnO, and 2 mols of $SiO_2$ were compounded with 100 mols of $BaTiO_3$ to produce a mixed powder.

A polyvinylbutyral type binder, an organic solvent such as ethanol or the like were added to the mixed powder, and wet-mixed by means of a ball mill to produce a ceramic slurry.

The ceramic slurry was formed into a sheet by the doctor blade method. Thus, a parallelepiped ceramic green sheet with a thickness of 2.5 μm was formed.

On the other hand, a conductive paste for forming inner electrodes was prepared. In particular, 47.5% by weight of nickel powder with an average grain size of 0.4 μm, 2.5% by weight of a ceramic powder described below, 35% by weight of an organic vehicle prepared by dissolving 10% by weight of ethyl cellulose in 90% by weight of terpineol, and 15% by weight of terpineol were mixed and dispersed by means of a three-roll mill. Thus, a conductive paste containing the nickel powder and the ceramic powder dispersed sufficiently therein was produced.

Referring to the ceramic powder added to the conductive paste, four types of ceramic powders for use in Example 1 and Comparative Examples 1, 2, and 3 were prepared, and four types of conductive pastes were produced by use of the respective ceramic powders, as described below.

(1) Example 1

$Dy_2O_3$ and MgO powders each having an average grain size of 0.2 μm were added to a $(Ba_{0.95}Ca_{0.05})TiO_3$ powder having an average grain size of 0.1 μm prepared by the same procedures as those for the substrate ceramic, wet-mixed by means of a ball mill, calcined at 800° C. for 2 hours, and ground. Thereby, a ceramic powder, which was a calcined material, was obtained. In this case, $(Ba_{0.95}Ca_{0.05})TiO_3$, $Dy_2O_3$, and MgO were compounded at a molar ratio of 100:2:1. The average grain size of the produced ceramic powder was about 0.2 μm, since the $(Ba_{0.95}Ca_{0.05})TiO_3$ powder with an average grain size of 0.2 μm was a major component.

(2) Comparative Example 1

A ceramic powder with an average grain size of about 0.5 μm was obtained in the same manner as that employed in Example 1 excepting that the average grain size of the $(Ba_{0.95}Ca_{0.05})TiO_3$ powder was 0.5 μm. The ceramic powder used in Comparative Example 1 was different from the ceramic powder in Example 1 only with respect to the average grain size.

(3) Comparative Example 2

The same ceramic raw material powder as that for the substrate ceramic was prepared. In particular, a $BaTiO_3$ powder with an average grain size of 0.3 µm, and powders of $Dy_2O_3$, MgO, MnO and $SiO_2$ each having an average grain size of 0.1 µm were prepared. Then 1 mol of $Dy_2O_3$, 1.5 mols of MgO, 0.2 mol of MnO and 2 mols of $SiO_2$ were compounded with 100 mols of $BaTiO_3$ to produce a mixed powder with an average grain size of 0.3 µm. This mixed powder was not heat-treated (not calcined).

(4) Comparative Example 3

The same raw material powders as those in Example 1 were mixed. Also, the compounding ratio was the same as that in Example 1. Thus, a mixed powder with an average grain size of about 0.2 µm was obtained. The mixed powder was not heat-treated (not calcined).

Regarding the conductive pastes of Example 1 and Comparative Examples 1, 2, and 3 produced as described above, the average grain sizes of the nickel powders contained in the conductive pastes, and the composition ratios, the treatment, and the average grain sizes of the ceramic powders contained therein were summarized in Table 1.

TABLE 1

| | Average grain size of nickel powder (µm) | Ceramic powder Composition ratio and treatment | Average grain size (µm) |
|---|---|---|---|
| Example 1 | 0.4 | Calcined material of 100 mol $(Ba_{0.95}Ca_{0.05})$—2 mol $TiO_3$—$Dy_2O_3$—1 mol MgO | 0.2 |
| Comparative example 1 | 0.4 | Calcined material of 100 mol $(Ba_{0.95}Ca_{0.05})$—2 mol $TiO_3$—$Dy_2O_3$—1 mol MgO | 0.5 |
| Comparative example 2 | 0.4 | Mixture of 100 mol $(BaTiO_3$—1 mol $Dy_2O_3$—1.5 mol MgO—0.2 mol MnO—2 mol $SiO_2$ | 0.3 |
| Comparative example 3 | 0.4 | Mixture of 100 mol $(Ba_{0.95}Ca_{0.05})TiO_3$—2 mol $Dy_2O_3$—1 mol MgO | 0.2 |

Subsequently, the conductive pastes of Example 1 and Comparative Examples 1 to 3 were screen-printed on the above-described ceramic green sheets. Thus, the conductive paste films to be the inner conductor films were formed.

Subsequently, a plurality of ceramic green sheets which include the ceramic green sheets having the conductive paste films thereon as described above were laminated and hot-press bonded. Thus, green laminates ware produced. In each of the green laminates, the conductive paste films extended to one of the end-faces thereof and those extended to the other end-face were alternately arranged in the lamination direction.

Next, the green laminate was heated at a temperature of 350° C. in a nitrogen-gas atmosphere to burn out the binder. Thereafter, the laminate was fired at a temperature 1220° C. for 2 hours in a reducing atmosphere having an oxygen partial pressure of $10^{-9}$ to $10^{-12}$ MPa and containing an $H_2$—$N_2$—$H_2O$ gas. Thus, a sintered laminate was obtained. The laminate was provided with the dielectric ceramic layers and the inner conductor films. The dielectric ceramic layers were formed by the sintering of the ceramic green sheets, and the inner conductor films were formed by the sintering of the conductive paste films.

Thereafter, a conductive paste containing a glass frit of the $B_2O_3$—$Li_2O$—$SiO_2$—BaO system and copper as a electro-conductive component was coated onto both of the end-faces of the laminate, and baked at a temperature of 800° C. in a nitrogen atmosphere. Thus, outer electrodes electrically connected to the inner conductor films were formed.

Regarding the outer size of the monolithic ceramic capacitor produced as described above, the width was 1.6 mm, the length was 3.2 mm and the thickness was 1.2 mm. The thickness of each of the dielectric ceramic layers present between the inner conductor films was 2 µm. The number of the effective dielectric ceramic layers was 100. The effective opposed-area per one layer of the inner conductor film was 2.1 mm$^2$.

Regarding the monolithic ceramic capacitors and the sintered laminates as samples formed as described above, the crack generation ratio, the electrostatic capacitance, the dispersion in electrostatic capacitance, the insulation resistance log IR, the dispersion in IR, and the number of products failing a high temperature loading test were evaluated, respectively. Table 2 shows the results.

In particular, the appearance of the sintered laminates as the samples was observed by means of an optical microscope to evaluate the generation of cracks. Moreover, each sintered laminate was coated with a resin to be strengthened and polished to a mirror-finish. An exposed cross-section was observed to evaluate the presence or absence of cracks generated inside the laminate. Thus, the generation ratio of cracks, that is, the sum of cracks present on the surface of the laminate and on the inner side thereof was determined.

Moreover, monolithic ceramic capacitors having no defects in the appearance and structure thereof were used as measurement samples. The electrostatic capacitances of the samples were measured under the condition of a temperature of 25° C., 1 kHz and 1 $V_{rms}$. The maximum, the minimum, and the standard deviation were determined to evaluate the dispersion of the static capacitances.

Similarly, monolithic ceramic capacitors having no defects in the appearance and structure were used as measurement samples. A 6 V DC voltage was applied to the samples at a room temperature for 2 minutes, and the insulation resistance (log IRs) thereof were measured. The maximum, the minimum, and the standard deviation were determined to evaluate the dispersion of the IRs.

Similarly, seventy two monolithic ceramic capacitors having no defects in the appearance and structure were used as measurement samples. A 10 V voltage was applied to the samples at a temperature of 150° C., and a high temperature loading test was carried for 250 hours. A sample of which the insulation resistance became 200 kΩ or lower was judged as an acceptable sample. Thus, the number of defectives in the high temperature loading test was determined.

TABLE 2

|  | Crack generation ratio (%) | Static capacitance (μF) | Dispersion in static capacitance (μF) | | | Insulation resistance Log IR | Dispersion in IR | | | Number of products unaccepted by high temperature loading test (based on 72 pieces) |
| --- | --- | --- | --- | --- | --- | --- | --- | --- | --- | --- |
|  |  |  | Maximum | Minimum | Standard deviation |  | Maximum | Minimum | Standard deviation |  |
| Example 1 | 0 | 2.54 | 2.63 | 2.45 | 0.03 | 10.33 | 10.52 | 10.12 | 0.03 | 0 |
| Comparative example 1 | 3 | 2.42 | 2.53 | 2.31 | 0.04 | 10.26 | 10.43 | 10.1 | 0.02 | 0 |
| Comparative example 2 | 25 | 2.33 | 2.77 | 1.88 | 0.18 | 9.64 | 10.51 | 8.72 | 0.27 | 5 |
| Comparative example 3 | 0 | 2.36 | 2.87 | 1.84 | 0.21 | 9.58 | 10.52 | 8.62 | 0.29 | 6 |

Subsequently, the ceramic powders added to prepare the conductive pastes of Example 1 and Comparative Examples 1, 2, and 3 as described above were formed into sheets in the same method as the ceramic raw material powder for forming a substrate ceramic. The produced sheets were punched and pressed to form disk-shaped samples.

The disk-shaped samples were fired at a firing temperature of 1220° C. as well as the substrate-use ceramic. Then, the bulk densities of the samples were measured. Moreover, the ratios of the bulk densities to the true densities of the ceramic powders as the samples were determined. The ratios were evaluated as relative densities. Table 3 shows the relative densities determined as described above.

TABLE 3

|  | Relative density (%) |
| --- | --- |
| Example 1 | 62 |
| Comparative example 1 | 35 |
| Comparative example 2 | 96 |
| Comparative example 3 | 67 |

If the relative density in Table 3 is 90% or higher, the ceramic power can be securely determined to have been sintered.

Figure 2:
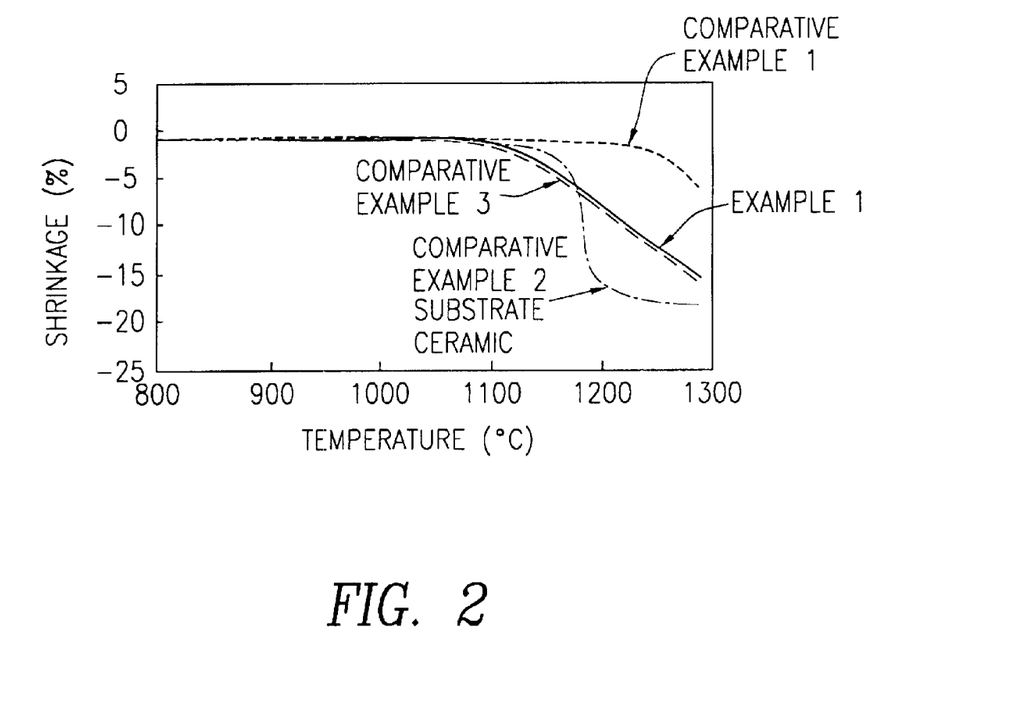
FIG. 2 is a graph showing the change of the shrink ratios with increasing temperature of the ceramic powders and the substrate ceramic of Example 1 and Comparative Examples 1 to 3 each added to the conductive paste in Experiment 1 carried out according the present invention.

Moreover, regarding the ceramic powders to be added to the conductive pastes of Examples 1 and Comparative Examples 1 to 3, the change of the shrink ratios, that is, the shrink behaviors, caused by raising of the temperature during the above-described firing process, were determined. FIG. 2 shows the results.

FIG. 2 also shows the shrink behavior of the substrate ceramic for comparison with those of the ceramic powders of Example 1 and Comparative Examples 1 to 3. The ceramic powder used in Comparative Example 2 was the same as the ceramic raw material powder for the substrate ceramic. Therefore, in FIG. 2, the curve of Comparative Example 2 overlaps that of the substrate ceramic.

Hereinafter, evaluation of the ceramic powders of Example 1 and Comparative Examples 1 to 3 with reference to Tables 1 to 3 and FIG. 2 is made.

In Example 1 and Comparative Examples 1 to 3, the static capacitances were about 2.5 μF and the insulation resistance log IRs were about 10, as shown in Table 2. Substantially no differences are present between these measurements. However, regarding the dispersion in the static capacitance, the dispersion in the IR and the number of defectives determined by the high temperature loading test, a relatively large difference is present between Example 1 and Comparative Examples 1 to 3.

In Example 1, the average grain size of the ceramic powder added to the conductive paste is smaller than that of the nickel powder, as shown in Table 1. Moreover, the relative density was 62%, that is, the relative density is significantly smaller than 90%, as shown in Table 3. Furthermore, as seen in the shrink behavior of FIG. 2, the ceramic powder was not sintered at the sintering temperature (1220° C.) of the substrate ceramic. Accordingly, no cracks were generated as shown in Table 2, and the ceramic power was suppressed from reacting with the substrate-use ceramic, the dispersions in static capacitance and IR are small, and the number of defectives determined by the high temperature loading test was zero. Thus, the stable characteristics can be obtained.

Comparative Example 1 and Example 1 are compared. It can be seen that cracks were generated in Comparative Example 1, although they are slight. The reason lies in that although the relative density of the ceramic powder to be added to the conductive paste in Comparative Example 1 and obtained by firing at the sintering temperature (1220° C.) of the substrate ceramic is low, as shown in Table 3, the average grain size of the ceramic powder is larger than that of the nickel powder as shown in Table 1, and therefore, the ceramic powder cannot be uniformly distributed between grains of the nickel powder in the dried conductive paste film before firing. Regarding the dispersions in static capacitance and IR, and the number of defectives determined by the high temperature loading test, the ceramic powder of Comparative Example 1 gives test results substantially equal to those of Example 1, since the ceramic was a calcined material, as was the ceramic powder of Example 1, and was suppressed from reacting with the substrate ceramic.

Comparative Example 2 and Example 1 are compared. It is seen that the crack generation ratio in Comparative Example 2 is very high, as shown in Table 2. This is supported by the shrink behavior shown in FIG. 2 and the high relative density of 96% of the ceramic powder fired at the sintering temperature (1220° C.) of the substrate ceramic shown in Table 3. The reason for the high crack generation ratio lies in that the ceramic powder of Comparative Example 2 was also sintered at the sintering temperature of the substrate ceramic. The ceramic powder of Comparative Example 2 was only a mixture of $BaTiO_3$ with $Dy_2O_3$, MgO, MnO and $SiO_2$. Therefore, a part of $Dy_2O_3$, MgO, MnO and $SiO_2$ reacted with the substrate-use ceramic. This increases the dispersions in static capacitance and IR and also the number of defectives determined by the high temperature loading test.

Comparative Example 3 and Example 1 are compared. The average grain size of the ceramic powder of Comparative Example 3 is smaller than that of the nickel powder as shown in Table 1. Moreover, as seen in the shrink behavior of FIG. 2 and the relative density in Table 3, the ceramic powder of Comparative Example 3 was not sintered at the sintering temperature (1220° C.) of the substrate ceramic. Therefore, no cracks were generated as shown in Table 2. However, since the ceramic powder of Comparative Example 3 was a mixture of $BaTiO_3$ with $Dy_2O_3$ and MgO as shown in Table 1, a part of $Dy_2O_3$ and MgO reacted with the substrate ceramic, so that the dispersions in static capacitance and IR become large. Moreover, the number of defectives determined by the high temperature loading test is increased.

Experiment 2

In Experiment 2, a substrate ceramic containing as a major component $(Ba_{0.9}Ca_{0.1})TiO_3$ having a molar ratio of Ba to Ca of 90:10 (moles) and a ratio of (Ba, Ca)/Ti of 1.002, and having $Ho_2O_3$, MgO, MnO, and $SiO_2$ added thereto was used. A copper powder with an average grain size of 0.5 $\mu$m was used as a conductive metallic powder to be contained in the conductive paste for forming the inner conductor films.

First, the $(Ba_{0.9}Ca_{0.1})TiO_3$ powder having an average grain size of 0.3 $\mu$m was prepared by substantially the same method as that used in Experiment 1. On the other hand, powers of $Ho_2O_3$, MgO, MnO, and $SiO_2$ each having an average grain size of 0.1 $\mu$m were prepared. Then, 0.5 mol of $Ho_2O_3$, 0.5 mol of MgO, 0.5 mol of MnO, and 3 mols of $SiO_2$ were compounded with 100 mols of $(Ba_{0.9}Ca_{0.1})TiO_3$ to produce a mixed powder, which is a ceramic raw material powder for forming a substrate ceramic.

Subsequently, the mixed powder was processed to be slurry by the same method as that in Experiment 1. Then, a ceramic green sheet was formed by use of the obtained ceramic slurry.

On the other hand, a conductive paste for forming inner conductor films was prepared by the same procedures as those in Experiment 1.

Regarding the ceramic powders added to the conductive paste, two types of ceramic powders were prepared in Example 2 and Comparative Example 4 as follows. Two types of conductive pastes were produced by use of the respective ceramic powders.

(1) Example 2

A $Y_2O_3$ powder having an average grain size of 0.1 $\mu$m was added to a $(Ba_{0.90}Sr_{0.05}Ca_{0.05})(Ti_{0.85}Zr_{0.15})O_3$ powder having an average grain size of 0.1 $\mu$m, of 0.3 mixed by means of a ball mill, calcined at a temperature of 800° C. for 2 hours, and ground. Thereby, a ceramic powder made of the calcined material was obtained. The compounding ratio of $(Ba_{0.90}Sr_{0.05}Ca_{0.05})(Ti_{0.85}Zr_{0.15})$ $O_3$ and $Y_2O_3$ was 100:1 (mole). The average grain size of the produced ceramic powder was about 0.1 $\mu$m, since the $(Ba_{0.90}Sr_{0.05}Ca_{0.05})$ $(Ti_{0.85}Zr_{0.15})O_3$ with an average grain size of 0.1 $\mu$m was a major component.

(2) Comparative Example 4

Powders of $Y_2O_3$ and $SiO_2$ each having an average grain size of 0.1 $\mu$m was added to a $(Ba_{0.90}Sr_{0.05}Ca_{0.05})(Ti_{0.85}Zr_{0.15})O_3$ powder having an average grain size of 0.3 $\mu$m, and wet-mixed by means of a ball mill. Thus, a ceramic powder was obtained as a mixture. Then, $(Ba_{0.90}Sr_{0.05}Ca_{0.05})$ $(Ti_{0.85}Zr_{0.15})O_3$, $Y_2O_3$, and $SiO_2$ were compound at a mole ratio of 100:1:2. The average grain size of the produced ceramic powder was about 0.3 $\mu$m, since the $(Ba_{0.90}Sr_{0.05}Ca_{0.05})$ $(Ti_{0.85}Zr_{0.15})O_3$ powder with an average size of 0.3 $\mu$m was a major component.

Table 4 shows the outlines of the conductive pastes of Example 2 and Comparative Example 4 produced as described above. Table 4 corresponds to Table 1 in Experiment 1.

TABLE 4

|  | Average grain size of Cu powder ($\mu$m) | Ceramic powder | |
|---|---|---|---|
|  |  | Composition ratio and processing | Average grain size ($\mu$m) |
| Example 2 | 0.5 | Calcined material of 100 mol $(Ba_{0.90}Sr_{0.05}Ca_{0.05})(Ti_{0.85}Zr_{0.15})$ $O_3$—1 mol $Y_2O_3$ | 0.1 |
| Comparative example 4 | 0.5 | Mixture of 100 mol $(Ba_{0.90}Sr_{0.05}Ca_{0.05})(Ti_{0.85}Zr_{0.15})$ $O_3$—1 mol $Y_2O_3$—2 mol $SiO_2$ | 0.3 |

Subsequently, monolithic ceramic capacitors as samples were produced by use of the above-described ceramic green sheet and the conductive pastes of Example 2 and Comparative Example 4 by the same method as that in Experiment 1.

Referring to the above-described production of the monolithic ceramic capacitors, the firing process was carried out at a temperature of 1000° C. for 2 hours in a reducing atmosphere having an oxygen partial pressure of $10^{-7.5}$ to $10^{-10}$ MPa and containing an $H_2$—$N_2$—$H_2O$ gas. Regarding the outer size of the obtained monolithic ceramic capacitors, the width was 1.6 mm, the length was 3.2 mm, and the thickness was 1.2 mm, as was those in Experiment 1. However, the thickness of each of the dielectric ceramic layers present between inner conductor films was 2.3 $\mu$m.

Figure 3:
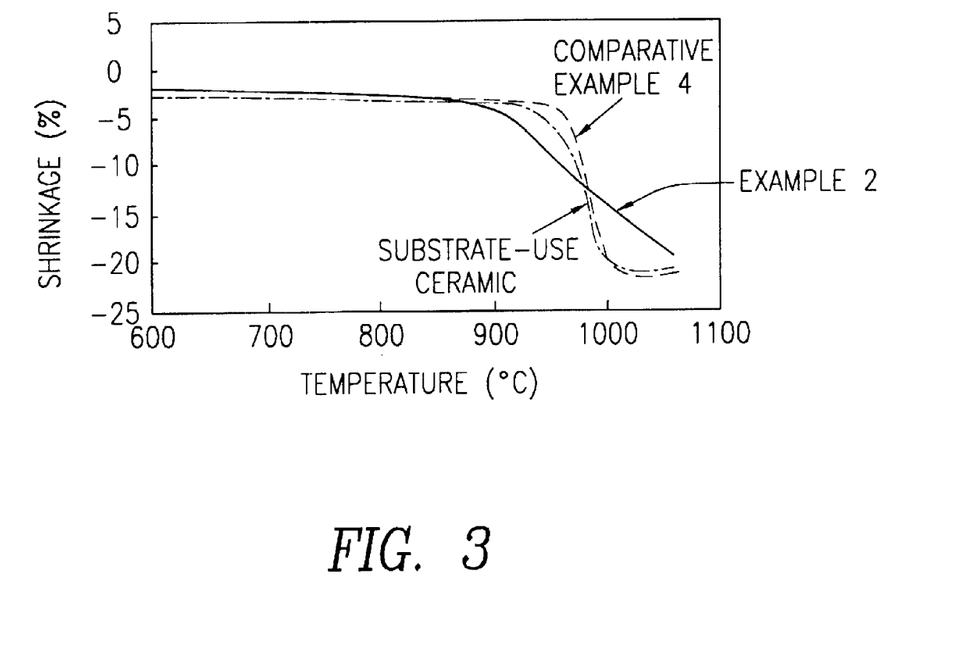
FIG. 3 is a graph showing the change of the shrink ratios with increasing temperature of the ceramic powders and the substrate-use ceramic of Example 2 and Comparative Example 4 each added to the conductive paste in Experimental Experiment 2 carried out according the present invention.

Subsequently, the various characteristics and properties thereof were evaluated in the same manners as those in Experiment 1. Tables 5 and 6 and FIG. 3 show the evaluation results. Table 5, Table 6, and FIG. 3 correspond to Table 2, Table 3, and FIG. 2 in Experiment 1, respectively.

TABLE 5

|  | Crack generation ratio (%) | Static capacitance ($\mu$F) | Dispersion in static capacitance ($\mu$F) | | | Insulation resistance Log IR | Dispersion in IR | | | Number of products unaccepted by high temperature loading test (based on 72 pieces) |
|---|---|---|---|---|---|---|---|---|---|---|
|  |  |  | Maximum | Minimum | Standard deviation |  | Maximum | Minimum | Standard deviation |  |
| Example 2 | 0 | 2.21 | 2.37 | 2.08 | 0.04 | 10.53 | 10.64 | 10.2 | 0.02 | 0 |
| Comparative example 4 | 15 | 2.1 | 2.38 | 1.81 | 0.11 | 10.31 | 10.65 | 9.91 | 0.11 | 7 |

TABLE 6

| | Relative density (%) |
|---|---|
| Example 2 | 66 |
| Comparative Example 4 | 94 |

In Example 2, the average grain size of the ceramic powder is smaller than that of the copper powder as shown in Table 4. Also, as shown in Table 6, the relative density is low, that is, 66%. Further, as seen in the shrink behavior of FIG. 3, the ceramic powder was not sintered at the sintering temperature (1000° C.) of the substrate ceramic. Accordingly, as shown in Table 5, cracks were not generated, and moreover, the ceramic power was suppressed from reacting with the substrate ceramic. Thus, the dispersions in static capacitance and IR are small, and the number of defectives determined by the high temperature loading test was zero, as shown in Table 5. That is, characteristics can be obtained with high stability.

On the other hand, a relatively large number of cracks were generated in Comparative Example 4, as shown in Table 5. The reason lies in that the ceramic powder was sintered at the sintering temperature (1000° C.) of the substrate-use ceramic, which can be seen in the shrink behavior in FIG. 3 and the high relative density of 94% in Table 6. Moreover, the ceramic powder of Comparative Example 4 was only a mixture of $(Ba_{0.90}Sr_{0.05}Ca_{0.05})(Ti_{0.85}Zr_{0.15})O_3$, $Y_2O_3$, and $SiO_2$. Therefore, a part of $Y_2O_3$ and $SiO_2$ reacted with the substrate ceramic, so that the dispersions in static capacitance and IR become large, and the number of defectives determined by the high temperature loading test increases.

Experiment 3

In Experiment 3, a substrate-use ceramic containing as a major component $(Ba_{0.90}Ca_{0.05}Sr_{0.05})(Ti_{0.85}Zr_{0.15})O_3$ having a molar ratio of Ba to Ca to Sr of 90:5:5 (mole), a ratio of Ti:Zr of 85:15 (mole), and a ratio of (Ba, Ca, Sr)/(Ti, Zr) of 1.001, and having $Y_2O_3$, MnO and $SiO_2$ added thereto was used. An Ag—Pd alloy powder having an average grain size of 0.4 $\mu$m was used as a conductive metallic powder to be contained in a conductive paste for forming inner conductor films.

First, a ceramic raw material powder for forming the substrate-use ceramic was prepared. That is, a $(Ba_{0.90}Ca_{0.05}Sr_{0.05})(Ti_{0.85}Zr_{0.15})O_3$ powder having an average grain size of 0.3 $\mu$m was prepared by using substantially the same method as that in Experiment 1. 0.2 mol of $Y_2O_3$ powder, 0.5 mol of MgO powder, 0.2 mol of MnO powder and 2 mols of $SiO_2$ powder each having an average grain size of 0.1 $\mu$m were added to and mixed with 100 mols of the $(Ba_{0.9}Ca_{0.05}Sr_{0.05})(Ti_{0.85}Zr_{0.15})O_3$ powder. Thus, a mixed powder was prepared as a substrate-use ceramic raw material powder.

Subsequently, the mixed powder was processed to become slurry by using the same manner as that in Experiment 1. Then, a ceramic green sheet was formed by use of the obtained ceramic slurry.

On the other hand, the conductive paste for forming the inner conductor films were prepared by the same procedures as those in Experiment 1. With respect to the ceramic powders to be added to the conductive paste, the following two types of conductive pastes were prepared in Example 3 and Comparative Example 5. Two types of conductive pastes were prepared by use of the respective ceramic powders.

(1) Example 3

Powders of $Ho_2O_3$ and MnO each having an average grain size of 0.1 $\mu$m were added to a $BaTiO_3$ powder with an average grain size of 0.1 $\mu$m, wet-mixed by means of a ball mill, calcined at 800° C. for 2 hours, and grounded. Thus, the ceramic powder was obtained as the calcined material. In this case, the compounding mole ratios of $BaTiO_3$, $Ho_2O_3$, and MnO were 100:1.5:0.5 (mole). The average grain size of the produced ceramic powder was about 0.1 $\mu$m, since the $BaTiO_3$ powder with an average grain size of 0.1 $\mu$m was a major component.

(2) Comparative Example 5

A ceramic powder with an average grain size of about 0.6 $\mu$m was produced by the same method as that in Example 3 excepting that the average grain size of the $BaTiO_3$ powder as the major component was 0.6 $\mu$m.

Table 7 shows the outlines of the conductive pastes of Example 3 and Comparative Example 5 produced as described above. Table 7 corresponds to Table 1 in Experiment 1 or Table 4 in Experiment 2.

TABLE 7

| | Average grain size of Ag—Pd powder ($\mu$m) | Ceramic powder | |
|---|---|---|---|
| | | Composition ratio and processing | Average grain size ($\mu$m) |
| Example 3 | 0.4 | Calcined material of 100 mol $BaTiO_3$—1.5 mole $Ho_2O_3$—0.5 mole MnO | 0.1 |
| Comparative Example 5 | 0.4 | Calcined material of 100 mol $BaTiO_3$—1.5 mole $Ho_2O_3$—0.5 mole MnO | 0.6 |

Monolithic ceramic capacitors as samples were produced by use of the above-described ceramic green sheet and the conductive pastes of Example 3 and Comparative Example 5 by substantially the same method as that in Experiment 1.

The firing process for producing the above-described monolithic ceramic capacitors was carried out at a temperature of 1100° C. for 2 hours in the atmosphere, which is different from that employed in Experiment 1. Regarding the outer sizes of the produced monolithic ceramic capacitors, the width was 1.6 mm, the length was 3.2 mm, and the thickness was 1.2 mm, similarly to those of the monolithic ceramic capacitors of Experiment 1. However, the thickness of each of the dielectric ceramic layers present between the inner conductor films was 2.1 $\mu$m.

Subsequently, of the various evaluation items with respect to Experiments 1 and 2, only the crack generation ratio and the relative density of the ceramic powders to be added to the conductive pastes and sintered at the sintering temperature (1100° C.) of the substrate ceramic regarding Example 3 and Comparative Example 5 were evaluated. Table 8 shows the evaluation results.

TABLE 8

| | Crack generation ratio (%) | Relative density (%) |
|---|---|---|
| Example 3 | 0 | 68 |
| Comparative Example 5 | 8 | 29 |

In Example 3, the average grain size of the ceramic powder added to the conductive paste was smaller than that of the Ag—Pd powder as shown in Table 7. The relative density shown in Table 8 of the ceramic powder is lower than 90%, that is, 68%. Therefore, the ceramic powder was not sintered at the sintering temperature (1100° C.) of the substrate ceramic. For this reason, no cracks were generated as shown in Table 8.

In Comparative Example 5, a relatively large number of cracks were formed as shown in Table 8. The reason is as follows. Although the relative density of the ceramic powder to be added to the conductive paste and sintered at the sintering temperature (1100° C.) of the substrate ceramic is very small as shown in Table 8, the average grain size of the ceramic powder is larger than that of the Ag—Pd powder as shown in Table. 7. Therefore, the ceramic powder could not be evenly distributed between grains of the Ag—Pd powder in the dried conductive paste film before firing.

Experiment 4

In Experiment 4, a substrate ceramic containing as a major component $(Ba_{0.95}Ca_{0.05})TiO_3$ having a molar ratio of Ba to Ca of 95:5 and a ratio of (Ba, Ca)/Ti of 1.003, and having $Dy_2O_3$, MgO, MnO, and $SiO_2$ added thereto was used. A nickel powder having an average grain size of 0.3 μm was used as a conductive metallic powder to be contained in a conductive paste for forming inner conductor films.

First, the $(Ba_{0.95}Ca_{0.05})TiO_3$ powder having an average grain size of 0.3 μm was prepared by using substantially the same method as that used in Experiment 1. Powders of $Dy_2O_3$, MgO, MnO and $SiO_2$ each having an average grain size of 0.1 μm were prepared, and 0.3 mol of $Dy_2O_3$, 0.5 mol of MgO, 0.5 mol of MnO, and 2.0 mol of $SiO_2$ were compounded with 100 mols of $(Ba_{0.95}Ca_{0.05})TiO_3$ to produce a mixed powder, which is a ceramic raw material powder for forming a substrate ceramic.

Subsequently, the mixed powder was processed into slurry by using the same method as that in Experiment 1. Then, a ceramic green sheet was formed by use of the obtained ceramic slurry.

On the other hand, a conductive paste of Example 4 for forming inner conductor films was prepared by the following method.

That is, $BaCO_3$, $CaCO_3$, $TiO_2$, $ZrO_2$ and $Y_2O_3$ each having an average grain size of 0.1 μm were mixed. In particular, 90 mols of $BaCO_3$, 5 mols of $CaCO_3$, 90 mols of $TiO_2$, 10 mols of $ZrO_2$ and 2.5 mols of $Y_2O_3$ were weighed out, compounded, wet-mixed by means of a ball mill, calcined at a temperature of 1100° C. for 2 hours, and grounded. Thus, a ceramic powder as a calcined material was formed. The average grain size of the ceramic powder was 0.15 μm.

Subsequently, 47.5% by weight of nickel powder with an average grain size of 0.3 μm, 2.5% by weight of the above-described ceramic powder, 35% by weight of an organic vehicle prepared by dissolving 10% by weight of ethyl cellulose in 90% by weight of terpineol, and 15% by weight of terpineol were mixed and dispersed by means of a three-roll mill. Thus, the conductive paste of Example 4 containing the nickel powder and the ceramic powder sufficiently dispersed therein was produced. Table 9 shows the outlines of the conductive paste of Example 4 produced as described above. Table 9 corresponds to Table 1 in Experiment 1.

TABLE 9

| | Average grain size of nickel powder (μm) | Ceramic powder | |
|---|---|---|---|
| | | Composition ratio and processing | Average grain size (μm) |
| Example 4 | 0.3 | Calcined material of 90 mol $BaCO_3$—5 mol $CaCO_3$—2.5 mol $Y_2O_3$—90 mol $TiO_2$—10 mol $ZrO_2$ | 0.15 |

Subsequently, monolithic ceramic capacitors as samples were produced by the same method as that in Experiment 1 using the above-described ceramic green sheet and the conductive pastes of Example 4.

Regarding the produced monolithic ceramic capacitors, the thickness of each of the dielectric ceramic layer between inner conductor films was 2.3 μm.

Then, the various characteristics and the properties were evaluated by the same method as that employed in Experiment 1. Tables 10 and 11 show the evaluation results. Table 10 corresponds to Table 2 in Experiment 1, and Table 11 corresponds to Table 3 therein.

TABLE 10

| | Crack generation ratio (%) | Static capacitance (μF) | Dispersion in static capacitance (μF) | | | Insulation resistance Log IR | Dispersion in IR | | | Number of products unaccepted by high temperature loading test (based on 72 pieces) |
|---|---|---|---|---|---|---|---|---|---|---|
| | | | Maximum | Minimum | Standard deviation | | Maximum | Minimum | Standard deviation | |
| Example 4 | 0 | 2.33 | 2.47 | 2.19 | 0.04 | 10.60 | 10.7 | 10.2 | 0.02 | 0 |

TABLE 11

| | Relative density (%) |
|---|---|
| Example 4 | 57 |

In Example 4, the average grain size of the ceramic powder is smaller than that of the nickel powder as shown in Table 9. As shown in Table 11, the relative density is low, that is, 57%. Thus, the ceramic powder was not sintered at the sintering temperature (1220° C.) of the substrate ceramic. Accordingly, as shown in Table 10, no cracks were generated, and moreover, the ceramic power is suppressed from reacting with the substrate ceramic. Thus, the dispersions in static capacitance and IR are small, and the number of defectives determined by the high temperature loading test was zero, as shown in Table 5. Therefore, it is seen that the stable characteristics were obtained.

As described above, the conductive paste of the present invention contains ceramic powder in addition to conductive metallic powder.

The ceramic powder is a powder produced by calcining an $ABO_3$ system in which A represents Ba or alternatively Ba partially substituted by at least one of Ca and Sr, and B represents Ti or alternatively Ti partially substituted by at least one of Zr and Hf, the system containing at least one selected from the group of consisting of Re compounds in which Re represents at least one of La, Ce, Pr, Nd, Sm, Eu, Gd, Tb, Dy, Ho, Er, Tm, Yb, Lu and Y, Mg compounds and Mn compounds. Therefore, the shrink behavior of the inner conductor films can be made to approach that of the ceramic layers in the firing process by using the conductive paste to form the inner conductor films of a monolithic ceramic electronic part.

Moreover, the ceramic powder has a smaller average grain size than the metallic powder. Therefore, the ceramic powder can be evenly distributed between the metallic powder in the conductive paste or the dried conductive past film.

Accordingly, structural defects such as cracks or the like can be suppressed in the sintered laminate contained in the produced monolithic ceramic electronic part.

The ceramic powder contained in the conductive paste is processed so as to be incapable of sintering at the sintering temperature of a substrate ceramic for forming ceramic layers of the monolithic ceramic electronic part. Therefore, the ceramic powder and the substrate ceramic can be prevented from partially reacting with each other during the firing process. Thus, the contained ceramic powder is prevented from substantially exerting an influence over the electrical characteristics of the ceramic layers. As a result, the dispersion in electrical characteristics of the produced monolithic ceramic electronic part can be reduced.

Accordingly, monolithic ceramic electronic parts having stable characteristics can be mass produced at a high yield.

When the present invention is applied to the monolithic ceramic capacitor, advantageously, the size of monolithic ceramic capacitors can be reduced, and the capacities thereof can be further increased.

In the monolithic ceramic electronic part of the present invention, the substrate-use ceramic having a major component expressed by the general formula $A'B'O_3$ in which A' represents Ba or alternatively Ba partially substituted by at least one of Ca and Sr, and B' represents Ti or alternatively Ti partially substituted by at least one of Zr and Hf, so that the ceramic powder contained in the conductive paste for forming the inner conductor films may have a composition which is the same as or similar to that of the substrate ceramic for forming the ceramic layers. Thereby, even if the components of the ceramic powder contained in the conductive paste diffuse into the ceramic layers, the effects of the diffusion can be prevented and minimized.

What is claimed is:

1. An electroconductive paste which is used to form inner conductor films of a monolithic ceramic electronic part having a plurality of ceramic layers made of a substrate ceramic and the inner conductor films extending on specific boundaries between the ceramic layers, comprising:

an electroconductive metallic powder;
a ceramic powder; and
an organic vehicle;
wherein the ceramic powder is a calcined powder of an $ABO_3$ ceramic in which A represents Ba or Ba partially substituted by at least one of Ca and Sr, and B represents Ti or Ti partially substituted by at least one of Zr and Hf: the ceramic powder containing at least one Re compound, Mg compound or Mn compounds, in which Re is at least one member selected from the group of consisting of La, Ce, Pr, Nd, Sm, Eu, Gd, Tb, Dy, Ho, Er, Tm, Yb, Lu, and Y, and
wherein the ceramic powder has an average grain size smaller than that of the metal powder and is incapable of sintering at the sintering temperature of the substrate ceramic.

2. An electroconductive paste according to claim 1, wherein the metallic powder is at least one selected from the group consisting of Ag, Ag-base alloys, Ni, Ni-base alloys, Cu, and Cu-base alloys.

3. An electroconductive paste according to claim 1, wherein the ceramic powder contains a Re compound, a Mn compound and a Mg compound.

4. An electroconductive paste according to claim 3, wherein Re is Dy, Ho or Y.

5. A method of producing a monolithic ceramic electronic part having a plurality of ceramic layers of substrate ceramic and inner conductor films extending along specific boundaries between the ceramic layers, comprising the steps of:

providing ceramic green sheets comprising a substrate ceramic raw material powder having the general formula $A'B'O_3$ in which A' represents Ba or Ba partially substituted by at least one of Ca and Sr, and B' represents Ti or Ti partially substituted by at least one of Zr and Hf, the ceramic green sheets having an electroconductive paste as defined in claim 2 on at least a portion of a surface thereof;
laminating a plurality of the ceramic green sheets so as to form a green laminate in which the electroconductive paste is provided on specific boundaries between the ceramic green sheets to form inner conductor films; and
firing the green laminate.

6. A method of producing a monolithic ceramic electronic part according to claim 5, further comprising the step of arranging the inner conductor films to be formed by use of the conductive paste via the ceramic layers in such a manner that a static capacitance can be generated, and after the firing the green laminate, forming outer electrodes on the outer surface of the sintered laminate in such a manner that the outer electrodes are electrically connected to specific ones of the inner conductor films to use the static capacitance, whereby a monolithic ceramic capacitor is formed.

7. A method of producing a monolithic ceramic electronic part according to claim 6, wherein the ceramic powder contains a Re compound, a Mn compound and a Mg compound.

8. A method of producing a monolithic ceramic electronic part according to claim 3, wherein Re is Dy, Ho or Y.

9. A method of producing a monolithic ceramic electronic part having a plurality of ceramic layers made of a substrate ceramic and inner conductor films extending specific boundaries between the ceramic layers, comprising the steps of:

providing ceramic green sheets comprising a substrate ceramic raw material powder having the general formula A'B'O$_3$ in which A' represents Ba or Ba partially substituted by at least one of Ca and Sr, and B' represents Ti or Ti partially substituted by at least one of Zr and Hf, the ceramic green sheets having an electroconductive paste as defined in claim 1 on at least a portion of a surface thereof;

laminating a plurality of the ceramic green sheets so as to form a green laminate in which the electroconductive paste is provided on specific boundaries between the ceramic green sheets to form inner conductor films; and firing the green laminate.

10. A method of producing a monolithic ceramic electronic part according to claim 9, further comprising the step of arranging the inner conductor films to be formed by use of the conductive paste via the ceramic layers in such a manner that a static capacitance can be generated, and after the firing the green laminate, forming outer electrodes on the outer surface of the sintered laminate in such a manner that the outer electrodes are electrically connected to specific ones of the inner conductor films to use the static capacitance, whereby a monolithic ceramic capacitor is formed.

11. A method of producing a monolithic ceramic electronic part according to claim 9, wherein the ceramic powder contains a Re compound, a Mn compound and a Mg compound.

12. A method of producing a monolithic ceramic electronic part according to claim 11, wherein Re is Dy, Ho or Y.

13. A monolithic ceramic electronic part comprising a laminate of a plurality of ceramic layers of a substrate ceramic and inner conductor films disposed at specific boundaries between ceramic layers, the substrate ceramic comprising a component expressed by the general formula A'B'O$_3$ in which A' represents Ba or Ba partially substituted by at least one of Ca and Sr, and B' represents Ti or Ti partially substituted by at least one of Zr and Hf, and the inner conductor films being a fired conductive paste as defined in claim 1.

14. A monolithic ceramic electronic part according to claim 13, wherein the inner conductor films are arranged via the ceramic layers in such a manner that a static capacitance can be generated, and the part further comprises outer electrodes on the outer surface of the sintered laminate in such a manner that the outer electrodes are electrically connected to specific ones of the inner conductor films to use the static capacitance, whereby a monolithic ceramic capacitor is formed.

15. A monolithic ceramic electronic part according to claim 13, wherein the ceramic powder contains a Re compound, a Mn compound and a Mg compound.

16. A monolithic ceramic electronic part according to claim 15, wherein Re is Dy, Ho or Y.

17. A monolithic ceramic electronic part comprising a laminate of a plurality of ceramic layers of a substrate ceramic and inner conductor films disposed at specific boundaries between the ceramic layers, the substrate ceramic comprising a component expressed by the general formula A'B'O$_3$ in which A' represents Ba or Ba partially substituted by at least one of Ca and Sr, and B' represents Ti or Ti partially substituted by at least one of Zr and Hf, and the inner conductor films being a final conductive paste as defined in claim 2.

18. A monolithic ceramic electronic part according to claim 17, wherein the inner conductor films are arranged via the ceramic layers in such a manner that a static capacitance can be generated, and the part further comprises outer electrodes on the outer surface of the sintered laminate in such a manner that the outer electrodes are electrically connected to specific ones of the inner conductor films to use the static capacitance, whereby a monolithic ceramic capacitor is formed.

19. A monolithic ceramic electronic part according to claim 17, wherein the ceramic powder contains a Re compound, a Mn compound and a Mg compound.

20. A method of producing a monolithic ceramic electronic part according to claim 19, wherein Re is Dy, Ho or Y.

* * * * *